(12) United States Patent
Moulding

(10) Patent No.: US 7,103,991 B2
(45) Date of Patent: Sep. 12, 2006

(54) REGENERATION OF AIR DRYER

(76) Inventor: Daniel Moulding, 15 Troy Road, Morley, Leeds West Yorkshire, LS27 8JG (GB)

( * ) Notice: Subject to any disclaimer, the term of this patent is extended or adjusted under 35 U.S.C. 154(b) by 0 days.

(21) Appl. No.: 10/477,424

(22) PCT Filed: May 28, 2002

(86) PCT No.: PCT/GB02/02487

§ 371 (c)(1),
(2), (4) Date: Sep. 10, 2004

(87) PCT Pub. No.: WO02/096732

PCT Pub. Date: Dec. 5, 2002

(65) Prior Publication Data

US 2005/0120582 A1   Jun. 9, 2005

(30) Foreign Application Priority Data

May 31, 2001 (GB) ................................ 0113205.9

(51) Int. Cl.
*F26B 3/00* (2006.01)
(52) U.S. Cl. ......................................... 34/330; 95/121
(58) Field of Classification Search ................... 34/330, 34/80, 82; 95/121; 96/130
See application file for complete search history.

(56) References Cited

U.S. PATENT DOCUMENTS

| 5,145,495 A | * | 9/1992 | Elamin ......................... 96/114 |
| 6,571,489 B1 | * | 6/2003 | Larsson et al. ............... 34/330 |

FOREIGN PATENT DOCUMENTS

| DE | 19 911 741 | * | 9/2000 |
| DE | 199 11 741 A1 | | 9/2000 |
| EP | 0 093 253 A1 | | 11/1983 |
| EP | 0 199 948 A1 | | 11/1986 |
| EP | 0 808 756 A1 | | 11/1997 |
| WO | WO 00/56427 A1 | | 9/2000 |

* cited by examiner

*Primary Examiner*—Stephen Gravini
(74) *Attorney, Agent, or Firm*—Nixon Peabody LLP; Jeffrey L. Costellia

(57) ABSTRACT

A method of initiating a regeneration event of an air braking system of a vehicle includes the steps of calculating the forward air volume in successive time intervals, tallying the total forward air volume and initiating a regeneration event at a saturation threshold of the dessicant material which may be varied in real time. The method also comprises calculating a reverse air volume, and ceasing a regeneration event at a dryness threshold of the dessicant material.

13 Claims, 1 Drawing Sheet

REGENERATION OF AIR DRYER

Figure 1:
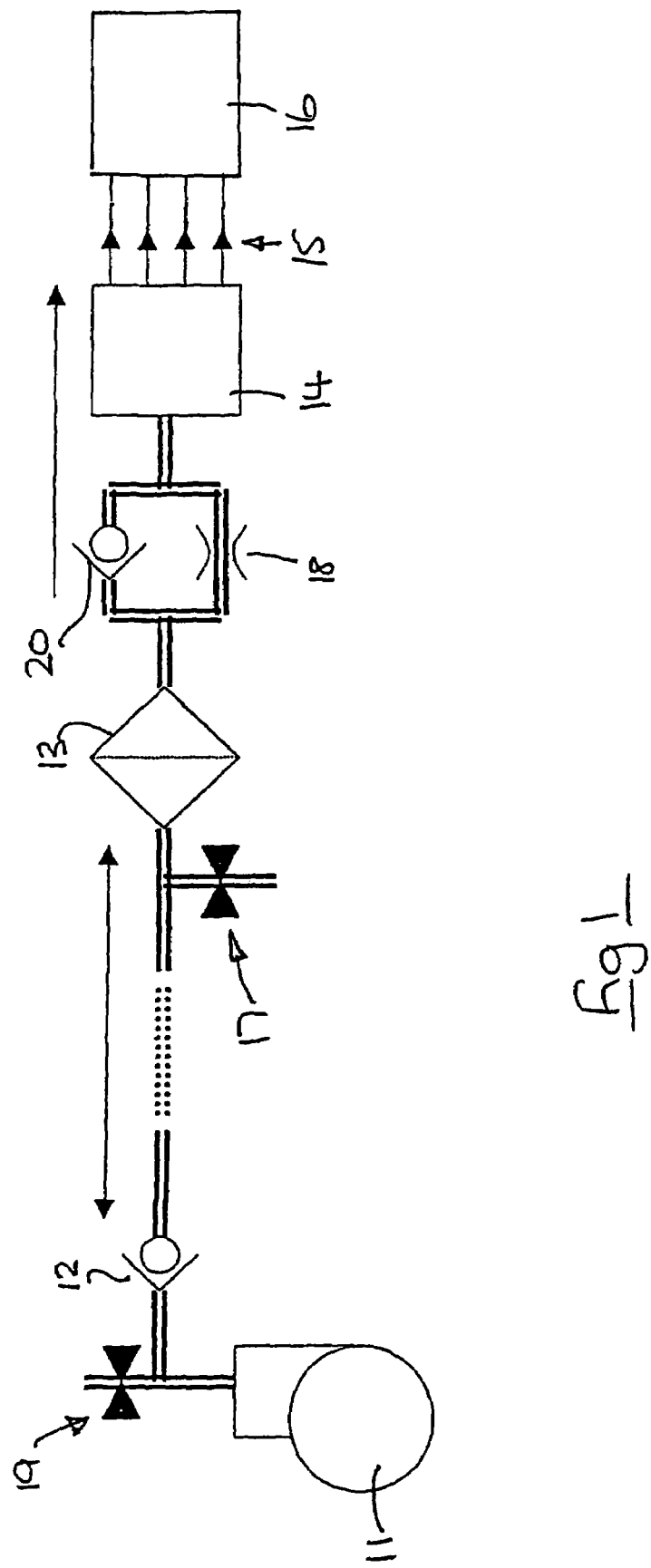

This invention concerns regeneration of an air dryer of an air braking system of a vehicle.

Air braking systems of vehicles use compressed air as the actuation medium. Typically air is supplied from an engine driven compressor to a reservoir, from which pressurized air is directed to wheel brakes via a foot operated demand valve. In order to avoid corrosion within the braking system air is passed from the compressor to the reservoir via an air dryer, comprising a cartridge of desiccant. In use the percentage of moisture within the desiccant progressively increases, and accordingly a periodic drying event is necessary in order to bring the desiccant back to a relatively dry state. This event is termed 'regeneration', and comprises a reverse flow of dry pressurized air through the desiccant to atmosphere.

Ideally it would be desirable to trigger a regeneration event when the desiccant reaches a predetermined moisture content. However suitable means for accurate real time measurement of moisture content in an air braking system are not available.

Traditionally regeneration is triggered in one of two ways, usually immediately after the compressor has come off-load, and the reservoir is accordingly at maximum system pressure.

In a time dependent system, pressurized air flows back through the desiccant to exhaust for a predetermined time. The time corresponds to a volume which can be calculated according to the size of a backflow orifice and a known pressure decay characteristic.

In a pressure dependent system, air flows back until system pressure has fallen by a predetermined amount. The volume is calculated from knowledge of the orifice size and pressure decay characteristic.

Both time and pressure can be measured accurately and inexpensively, but both methods have inherent disadvantages. If air is used by the system during the regeneration phase, the backflow volume will not reach the design calculation, and accordingly insufficient drying will occur. Furthermore heavy depletion of air by the system may cause the compressor to come on-load, thus terminating the regeneration event early. Repeated events of this kind will lead to progressive saturation of the desiccant.

In an attempt to overcome these disadvantages, the system design parameters are usually compromised so that over-drying of the desiccant often occurs. Thus the regeneration time is increased, or the pressure drop is increased in order to give effective drying under the worst vehicle operating conditions. Uncertainty concerning the kind of use to which a vehicle may be put can lead to pessimistic system settings and excessive over-regeneration. This in turn means that much air is wasted, and accordingly vehicle fuel consumption is higher than necessary.

An additional and potentially more serious disadvantage of existing regeneration methods is that heavy and continuous use of air may lead to long running of the compressor before cut-out pressure is reached, and under these circumstances regeneration will be inhibited, and saturation of the desiccant may occur. Current methods do not permit this circumstance to be easily identified.

According to the invention there is provided a method of initiating a regeneration event for the air dryer of a vehicle air braking system, the method comprising the steps of:
estimating in real time the instantaneous flow rate of air from an air compressor;
modifying the instantaneous flow rate according to conditions of the air braking system;
calculating the volume of air from the compressor for a predetermined time interval;
repeating said estimating, modifying and calculating steps for successive time intervals to provide a current tally of volume;
periodically comparing the current tally with a saturation threshold;
and initiating a regeneration event when said tally reaches or exceeds said saturation threshold.

The method of the invention is based on a direct estimation of volume rather than measurement of the indirect parameters of time and pressure. Accordingly a regeneration event can be initiated more accurately, and thus less frequently than if initiated according to the necessarily pessimistic estimation of the prior art methods.

Instantaneous flow rate can be estimated from a compressor performance characteristic and instantaneous compressor speed. The former may be stored digitally in e.g. a look-up table and the latter can usually be obtained electronically from a vehicle engine management system as a simple ratio of engine speed.

The instantaneous flow rate may be modified according to other system parameters, for example ambient air temperature, compressor temperature, air density and the like. The flow rate may also be modified according to an anticipated reduction in compressor performance over time; for this calculation the number of compressor cycles may be summed in a register and derived from an input of compressor or engine speed over time. This performance reduction correction may also be dependent on the ratio of on-load to off-load running time, derived from the usual governor pressure signal.

In a preferred embodiment real time estimation of flow rate may typically occur at intervals of 100 milliseconds, and accordingly the tally of pumped volume will be increased for each such time interval.

The saturation threshold is determined according to desiccant volume and anticipated operating conditions of the vehicle. In a preferred embodiment this threshold is settable within a predetermined range. In addition the saturation threshold may be varied in real time to reflect system conditions such as desiccant temperature. It is for example known that moisture take-up is a function of desiccant temperature, and accordingly that it would be desirable to take temperature into account in order to regenerate optimally. The present invention provides a method which can take desiccant temperature into account.

In a preferred embodiment, the invention comprises a method of estimating the volume of backflow of dry air according to operating conditions and system parameters in order to optimize the backflow volume closely to the ideal volume.

Typically this method comprises the steps of:
estimating in real time the instantaneous reverse flow rate of dry air to the air dryer;
modifying the instantaneous reverse flow rate according to conditions to the air braking system;
calculating the volume of reverse air for a predetermined time interval;
repeating said estimating, modifying and calculating steps for successive time intervals to provide a current tally of reverse air volume;
periodically comparing said tally with a dryness threshold;
and ceasing a regeneration event when said tally reaches or exceeds said dryness threshold.

Again, this method is based on an estimation of volume rather than the indirect parameters of time or pressure. Accordingly a regeneration event can be controlled to a precise volume of reverse air, and is thus less likely to waste air than prior art methods which necessarily rely on a pessimistic, and inevitably larger, estimation of reverse air volume.

In a preferred embodiment the volume of dry air flowing through the desiccant in reverse at close to atmospheric pressure is equal to the volume of pressurized air flowing from the compressor to the reservoir.

Instantaneous reverse flow rate can be determined from factors such as system pressure, air dryer pressure, and the flow characteristic of the usual orifice through which high pressure air is expanded to increase low pressure volume.

The reverse air flow rate may be modified according to system parameters such as air temperature.

Flow rate estimations typically occur at intervals of 100 milliseconds, thus permitting successive calculation of reverse air volumes and a tally of total reverse air volume.

The dryness threshold may be settable according to vehicle operating conditions, and may be varied in real time according to reflect system conditions such as desiccant temperature. The threshold may reflect an anticipated reduction in desiccant performance over time, which may be derived from a digital look-up table, and timed by recording engine running time from a vehicle service interval at which the desiccant was last renewed.

The methods described above include modifying the rate of air flow, but it is equally possible to first calculate the volume of forward or reverse air, and then perform the step of modifying the data.

It is anticipated that the methods of estimating forward and reverse air volume will be used together to provide an intelligent control system. However it will be understood that either method can be used in isolation, and particularly that the method of estimating reverse air volume can be used with a conventional regeneration trigger, such as the compressor coming off-load.

Regeneration events may terminate early due to the compressor being brought on-load. In these circumstances the present invention permits an estimation of the volume of reverse air up to the time at which regeneration is suspended, and this enables the regeneration event to be completed when the compressor next goes off-load. A subsequent regeneration event may combine a portion suspended from a previous event, and a portion corresponding to the intervening flow of air in the forward direction.

Other features of the invention will be apparent from the following description of a preferred embodiment shown by way of example only in the accompanying drawings in which:

FIG. 1 is a schematic illustration of a conventional charging arrangement of an air system of a vehicle.

FIG. 1 illustrates schematically a compressor 11 operable to pump air via a valve 12 and air dryer 13 to a reservoir 14, from which air under pressure passes via one or more check valves 15 to an air system 16 of a vehicle.

A valve 17 may be opened to connect the reservoir 14 to atmosphere via a restrictor 18 and the air dryer 13.

The compressor 11 is typically driven by a vehicle engine and may be brought on-load and taken off-load by conventional means such as bead unloader 19, operable for example by a governor signal responsive to pressure in the reservoir 14. Thus the compressor will come on-load at or below a low pressure threshold and come off-load at a high pressure threshold.

In use air is pumped via the valve 12, air dryer 13 and non return valve 20 into the reservoir 14 until a cut-off pressure is reached, at which point the compressor is taken off-load. Compressed air is used on demand by the system 16 until pressure in the reservoir falls below the cut-in pressure, at which point the compressor comes on-load to repeat the charging cycle.

Regeneration of the air dryer occurs at times when the compressor is off-load, typically immediately after reaching the cut-off pressure. A regeneration signal causes the valve 17 to open, thus allowing dry air to pass through the air dryer in reverse and carry moisture from the desiccant to atmosphere.

The unidirectional valve 20 and orifice 18 are provided in a conventional manner so that compressed air is expanded in a controlled fashion through the air dryer. Typically the volume of compressed air in the forward direction is equal to the volume of air expanded through the air dryer at atmospheric pressure for each regeneration event.

At the conclusion of the regeneration event the valve 17 closes so as to permit charging of the reservoir when the compressor is next brought on-load. Sudden depletion of the reservoir, for example due to heavy use of air by the system 16, may terminate a regeneration event early, because system demand usually has priority. Various conventional control systems may be added to the illustration of FIG. 1 to enhance performance.

Conventionally a regeneration event is terminated after a predetermined time or after a predetermined drop in pressure in the reservoir. In some systems a dedicated purge reservoir is provided for the air dryer, and regeneration continues until the purge reservoir is empty or the compressor is brought back on-load. An additional purge reservoir increases the cost of conventional installations.

In the present invention the volume of forward air is estimated repeatedly over successive time intervals in order to give a tally of total forward volume. In a simple embodiment this estimate is made from a compressor performance characteristic and an instantaneous input of engine speed obtained from the usual engine control systems. Since compressor speed is a ratio of engine speed, according to the drive gear or drive pulley ratio, the estimated volumetric output can be calculated. Repeated estimations at time intervals of about 100 milliseconds give a tally of forward air volume which is a very close approximation to the real forward air volume. Correction factors can be applied mathematically to the estimation of forward air volume. These include real time factors such as ambient air temperature, compressor temperature and air density, and settable factors including for example ambient humidity. In the latter case an external adjustment according to the country of operation may differentiate between relatively dry and relatively humid countries, and thus avoid unnecessary regeneration where ambient humidity is relatively low.

In the same way the volume of reverse air can be estimated in real time as a regeneration event proceeds. In this case a main estimate is made successively from information concerning system pressure and the flow characteristic of the usual orifice through which pressurized air is expanded. Correction factors may be automatically applied in the same way to reflect changes in orifice performance with temperature and the like, and system parameters may be also settable to reflect general operating conditions of the vehicle.

The regeneration event is initiated according to estimations of forward air volume, and the next off-load event of the compressor, and is terminated when the estimated expanded volume in reverse equals the volume of compressed air in the forwards direction.

The regeneration event may of course be terminated early in event of heavy air usage, and of the compressor consequently coming on-load. The present invention permits the volume of reverse air up to the point of cessation to be calculated, and thus the volume of additional reverse air required to bring the desiccant back to a predetermined level of dryness. At the next regeneration event this additional volume can be taken into account, or alternatively a short regeneration event can be initiated in order to cause the additional volume to flow through the desiccant. Various options are possible once an accurate estimation of volumetric flow can be made, according to the methods disclosed in this application.

In a typical air system installation, the fluid line from the compressor to the air dryer may contain a significant volume of air. When the compressor goes off-load this line is usually vented to atmosphere, or alternatively the compressor may be brought off-load by opening this line, and thus allow the compress to freewheel.

A significant volume of air may thus be compressed, but not passed through the air dryer. In order to improve the estimation of forward air, the method may include the step of subtracting from the estimate of forward air, the volume of air present in the delivery line, and which is vented when the compressor comes off-load. Alternatively the method may separately estimate the volume of air pumped by the compressor, but only tally forward air once a volume equal to the volume of the delivery line has been reached.

What is claimed is:

1. A method of initiating a regeneration event for the air dryer of a vehicle air braking system, the method comprising the steps of:
   estimating in real time the instantaneous flow rate of air from an air compressor;
   modifying the instantaneous flow rate according to conditions of the air braking system;
   calculating the volume of air from the compressor for a predetermined time interval;
   repeating said estimating, modifying and calculating steps for successive time intervals to provide a current tally of forward air volume;
   periodically comparing the current tally with a saturation threshold;
   and initiating a regeneration event when said tally reaches or exceeds said saturation threshold.

2. The method of claim 1 wherein said calculating step is determined from a compressor performance characteristic and instantaneous compressor speed.

3. The method of claim 1 or claim 2 wherein said modifying step makes reference to one or more of ambient air temperature, compressor temperature, air density, reduction in compressor performance over time, and the ratio of compressor on-load to off-load running time.

4. The method claim 1 wherein said time interval is approximately 100 milliseconds.

5. The method of claim 1, and further including the initial step of setting said saturation threshold.

6. The method of claim 1, and further including the step of varying said saturation threshold in real time.

7. The method of claim 1 and further including a method of estimating the volume of backflow of dry air comprising the steps of:
   estimating in real time the instantaneous reverse flow rate of dry air to the air dryer;
   modifying the instantaneous reverse flow rate according to conditions to the aft braking system;
   calculating the volume of reverse air for a predetermined time interval;
   repeating said estimating, modifying and calculating steps for successive time intervals to provide a current tally of reverse air volume;
   periodically comparing said tally with a dryness threshold;
   and ceasing a regeneration event when said tally reaches or exceeds said dryness threshold.

8. The method of claim 7 wherein said reverse air volume is calculated from system pressure, air dryer pressure, and flow characteristic of the air orifice through which high pressure air is expanded.

9. The method of claim 7 or claim 8 wherein said modifying step comprises adjusting the reverse air flow rate according to ambient air temperature.

10. The method of claim 7 or 8 and including the initial step of setting the dryness threshold.

11. The method of claim 10 including the step of varying said dryness threshold in real time.

12. A method according to claim 1 and including the step of reducing said tally of forward air volume by an amount equal to the volume of the delivery line from the compressor to the air dryer.

13. A method according to claim 1, wherein the instantaneous tally of forward air volume is less than the actual volume of forward air by the volume of the delivery line from the compressor to the air dryer.

* * * * *